Nov. 15, 1949     J. V. H. NEVILLE     2,488,138
METHOD OF AND APPARATUS FOR MAKING RADIOGRAPHS
Filed March 13, 1944
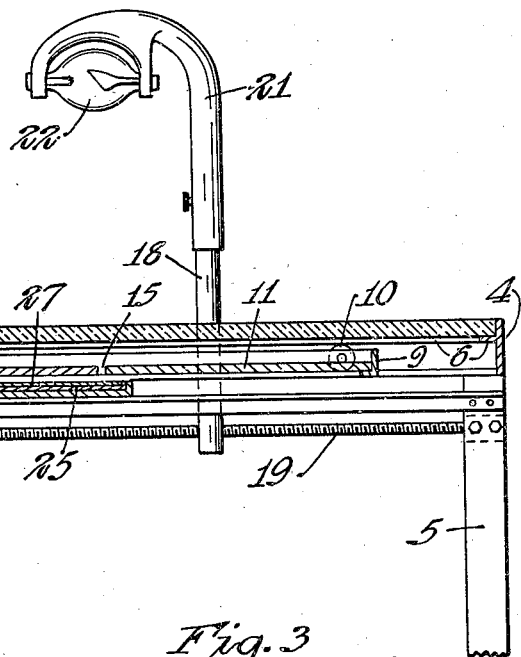
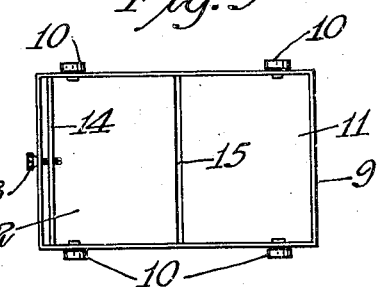
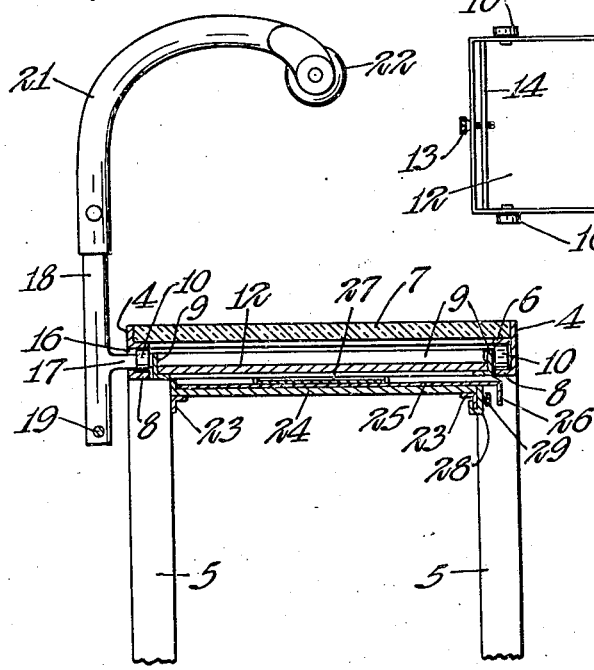
Inventor
John V. H. Neville
By Williamson & Williamson
Attorneys Patented Nov. 15, 1949

2,488,138

UNITED STATES PATENT OFFICE 2,488,138

METHOD OF AND APPARATUS FOR MAKING RADIOGRAPHS

John Vernon Henry Neville, Columbus, Mont.

Application March 13, 1944, Serial No. 526,178

4 Claims. (Cl. 250—53)

This invention relates to a method of and apparatus for making radiographs.

A radiograph or X-ray picture is made by placing the subject, usually a part of the body, between an X-ray lamp and a sensitized film, those rays which pass through bones and other dense objects striking the film with less intensity than the rays that merely pass through body tissue thus forming what appears to be a shadow on the film.

The rays from an X-ray lamp or tube are directed outwardly from the tube from a relatively small point on the target in the tube and these rays leave the target along divergent lines. The representation of the subject is somewhat enlarged and distorted because of the divergence of the rays and this distortion is sometimes so confusing as to greatly lessen the effectiveness of the radiograph. An example of this is very apparent in spinal radiographs since the representations of the closely positioned vertebrae are not only enlarged and distorted but overlap and create a confused representation of the actual size and relative location of adjacent bone structure.

It is an object of my invention to provide a method of and apparatus for producing a more true radiograph by utilizing only the most direct rays having the least divergence and thereby securing a minimum of enlargement and distortion.

A further object is to provide a method of and means for making radiographs wherein a nearly exact measurement of the pictured parts can be obtained.

More specifically it is an object of the invention to provide a method of and means for making radiographs wherein a ray gate is interposed between the ray source and the sensitized film and particularly between the subject and the film to cut out the more divergent rays and permit only the perpendicular or nearly perpendicular rays to pass through the subject to the sensitized film.

Still a further object of the invention is to provide a method and apparatus as described above wherein the ray gate can be moved relative to the subject and the film to expose successive portions of the film successively to direct rays from the ray source, the latter preferably being moved with the ray gate to keep the effective rays perpendicular to the film.

These and other objects and advantages of the invention will more fully appear from the following description made in connection with the accompanying drawing, wherein like reference characters refer to the same parts throughout the views, and, in which:

Fig. 1 is a longitudinal vertical section through the apparatus;

Fig. 2 is a transverse vertical section therethrough; and

Fig. 3 is a plan view on a reduced scale of the ray gate unit.

In the drawing there is shown a table including a frame 4 supported by suitable legs 5. The frame 4 has an inwardly extending flange 6 adapted to support a table top 7 of glass or some other material which will readily transmit X-rays.

Beneath the flange 6 on the frame 4 is an inwardly extending flange 8 extending along the longitudinal sides of said frame 4 to support a ray-gate frame 9 having rollers 10 which ride upon the flanges 8 on the main frame 4. The ray-gate frame 9 is adapted to support a gate made up of a pair of lead sheets 11 and 12, as best shown in Figures 1 and 3. The left hand section 12 is adapted to slide longitudinally in the frame 9 and its position can be adjusted by means of a hand screw 13 which extends through an end of the frame 9 and is threaded into the upturned edge 14 on the lead plate section 12.

The spaced location of the lead plate sections 11 and 12 provide a ray transmitting gap 15, said gap extending transversely of a ray-gate frame 9 and the main table frame 4.

As viewed in Figure 2 the left hand side frame member 4 is provided with a longitudinal cut out or opening 16 through which extends a bracket arm 17 forming a part of a main bracket 18. The arm 17 is suitably connected to a side of the ray-gate frame 9 for movement therewith longitudinally of the table. The lower portion of the bracket 18 threadedly receives a threaded rod 19 adapted to be rotated by an electric motor 20 to provide a power drive for the ray gate and bracket unit. The bracket 18 extends upwardly and is provided with a telescoping top portion 21 which extends over and above the central portion of the table and carries a suitable X-ray tube or lamp 22.

Extending longitudinally of the table below the ray gate carriage or frame is a pair of angle iron supports 23 which supports a shelf 24. On the shelf 24 a tray 25 is supported, said tray being extended outwardly beyond one of the side edges of the shelf 24 and turned down to provide a pull or handle 26 permitting the tray to be slid out from beneath the lead sheet ray gate sections 11 and 12. The tray 25 is adapted to support a sensitized film 27 closely beneath the lead sheet sections 11 and 12.

The shelf 24 which supports the tray 25 and film 27 has a clamp 28 secured thereto as shown in Figure 2 which permits said shelf 24 and tray 25 to be moved longitudinally of the table and removably secured at any desired position along the table by means of a hand screw 29.

The patient or part of a patient's body is placed upon the table top 7 with the film 27 beneath the part to be radiographed. The lead plate unit and the X-ray lamp are positioned with the part to be radiographed between them and with the ray gap 15 between the lead plates 11 and 12 preferably at one end of the film 27, whereupon the X-ray tube 22 can be energized causing rays to pass downwardly through the gap 15 between the lead plates 11 and 12 to the sensitized film 27 after passing through a limb or other body portion of the patient. As a result of the narrowness of the light gap 15 the only rays which pass through the gap in relation to the length of the table are perpendicular or practically perpendicular rays. The lead sheet ray gate unit can then be shifted to expose successive portions of the film and record radiograph representations of successive portions of the body or body part being investigated. It is, of course, possible to have the motor drive for moving the lead plates and X-ray lamp geared low enough to have the plates and lamp as a unit moved continuously at a very low speed instead of shifting them with a step-by-step movement.

It is true that because of the length of the light gap 15 there will be distortion laterally or transversely of the table and the film but this is of no great importance since the method and apparatus are particularly adaptable for recording the condition of elongated relatively narrow bones or bone structures although the subject of the radiograph can be shifted to lie transversely of the table so that a radiograph can be taken at right angles to the first one and secure the improved fidelity and lack of distortion afforded by the invention.

It will, of course, be understood that various changes may be made in the form, details, arrangement and proportions and in the steps of the method without departing from the scope of my invention.

What I claim is:

1. Apparatus for making radiographs comprising, a sensitized film holder, a source of rays, a ray gate positioned between said ray source and said film holder, said ray gate being spaced a considerable distance from said ray source and closely adjacent said film holder, said apparatus having a subject placement station between said ray source and said ray gate, and said ray source and ray gate being movable together in the same direction and at the same speed and relative to said film holder.

2. Apparatus for making radiographs comprising, a sensitized film holder, a source of rays, a ray gate positioned between said ray source and said film holder, said ray gate being spaced a considerable distance from said ray source and closely adjacent said film holder, a subject positioning device located between said ray source and said ray gate, and said ray source and ray gate being movable together and at the same speed and relative to said subject positioning device and said film holder.

3. Apparatus for making radiographs comprising, a sensitized film holder, a source of rays, a ray gate positioned a substantial distance from said ray source and between said source and said film holder and close to said holder, said ray gate including a ray masking portion and a ray transmitting portion, said ray source and ray gate being interconnected for simultaneous movement at the same speed, said ray gate transmitting portion being relatively narrow in one direction and being elongated in a direction transverse to the direction of movement of said ray source and ray gate, and said apparatus having a subject placement station between said ray source and said ray gate.

4. A method of making radiographs which includes placing the subject between a source of rays and a sensitized film, exposing the subject to rays from said source, moving said ray source relative to the subject and the film, and exposing narrow successive parallel band-like portions of said film in a direction transversely of said bands by means of a ray gate interposed between the subject and the film, the ray source and the ray gate being moved at substantially the same speed and in the same direction relative to the subject and the film.

JOHN VERNON HENRY NEVILLE.

REFERENCES CITED

The following references are of record in the file of this patent:

UNITED STATES PATENTS

| Number | Name | Date |
|---|---|---|
| 1,471,081 | Waite | Oct. 16, 1923 |
| 1,704,477 | Jacobson | Mar. 5, 1929 |
| 2,320,587 | Gieringer et al. | June 1, 1943 |
| 2,386,658 | Caspersz | Oct. 9, 1945 |